(12) United States Patent
Kärkkäinen et al.

(10) Patent No.: US 10,728,374 B2
(45) Date of Patent: Jul. 28, 2020

(54) ADDITIONAL INFORMATION ON A CALLER

(71) Applicant: Gurulogic Microsystems Oy, Turku (FI)

(72) Inventors: Tuomas Kärkkäinen, Turku (FI); Ossi Kalevo, Turku (FI)

(73) Assignee: Gurulogic Microsystems Oy, Turku (FI)

(*) Notice: Subject to any disclaimer, the term of this patent is extended or adjusted under 35 U.S.C. 154(b) by 0 days.

(21) Appl. No.: 16/105,073

(22) Filed: Aug. 20, 2018

(65) Prior Publication Data

US 2018/0359347 A1    Dec. 13, 2018

Related U.S. Application Data

(63) Continuation of application No. 15/304,664, filed as application No. PCT/EP2015/058178 on Apr. 15, 2015, now Pat. No. 10,057,396.

(30) Foreign Application Priority Data

Apr. 17, 2014  (EP) .................................... 14165113

(51) Int. Cl.
*H04M 1/56* (2006.01)
*H04M 15/06* (2006.01)
(Continued)

(52) U.S. Cl.
CPC .............. *H04M 1/575* (2013.01); *H04M 1/57* (2013.01); *H04M 3/42042* (2013.01); *H04M 3/42068* (2013.01); *H04M 3/42076* (2013.01)

(58) Field of Classification Search
CPC ............... H04M 1/57; H04M 3/42042; H04M 3/42059; H04M 3/42068; H04M 3301/38;
(Continued)

(56) References Cited

U.S. PATENT DOCUMENTS 5,434,913 A * 7/1995 Tung .................... H04L 12/1813
348/E7.083
6,452,924 B1 * 9/2002 Golden .............. H04Q 11/0478
370/254

(Continued)

FOREIGN PATENT DOCUMENTS

CN      102202288 A      9/2011
JP      H02246688 A      10/1990
(Continued)

OTHER PUBLICATIONS

Office Action of the Chinese Patent Office, Application No. 201580027666.9, dated Aug. 30, 2018, 19 Pages.
(Continued)

*Primary Examiner* — Binh Kien Tieu
(74) *Attorney, Agent, or Firm* — Ziegler IP Law Group LLC

(57) ABSTRACT

To provide a called one with information on the caller, a reference to a resource containing real-time or near-real-time information relating to the caller, or information deduced using the real-time or near-real-time information, or the real-time or near-real-time information, or the information deduced using the real-time or near-real-time information, is transmitted with a connection establishment request, and the information in the resource or the received information is displayed to the called one before the requested connection is established so that the called one can make a decision whether or not to answer the call.

20 Claims, 8 Drawing Sheets

(51) Int. Cl.
*H04M 1/57* (2006.01)
*H04M 3/42* (2006.01)

(58) Field of Classification Search
CPC .............. H04M 2242/22; H04L 29/06; H04L 29/06027; H04L 29/12094; H04L 61/1529; H04L 65/1069; H04Q 11/0435; H04Q 2213/13091; H04Q 2213/13175
USPC ... 379/93.17, 93.23, 142.01, 142.02, 142.04, 379/142.09, 142.17, 242, 245, 247
See application file for complete search history.

(56) References Cited

U.S. PATENT DOCUMENTS

| | | | |
|---|---|---|---|
| 6,766,007 | B1 | 7/2004 | Dermler et al. |
| 8,957,936 | B2 | 2/2015 | Grevers, Jr. |
| 8,976,227 | B2 | 3/2015 | Cerami et al. |
| 9,118,760 | B2 | 8/2015 | Atef et al. |
| 9,197,856 | B1 | 11/2015 | Tangeland et al. |
| 9,282,287 | B1 | 3/2016 | Marsh |
| 9,325,938 | B2 | 4/2016 | Paragano et al. |
| 9,344,675 | B1 | 5/2016 | Chord et al. |
| 2005/0084084 | A1 | 4/2005 | Cook et al. |
| 2007/0206736 | A1 | 9/2007 | Sprigg et al. |
| 2008/0063166 | A1* | 3/2008 | An .................. H04M 1/576 379/142.04 |
| 2008/0112551 | A1 | 5/2008 | Forbes et al. |
| 2009/0097622 | A1 | 4/2009 | Sangberg |
| 2009/0109957 | A1* | 4/2009 | Caradec ............. H04M 3/02 370/352 |
| 2011/0212705 | A1 | 9/2011 | Sprigg et al. |
| 2013/0034146 | A1* | 2/2013 | Jeong ................ H04N 7/147 375/240.01 |
| 2015/0215579 | A1 | 7/2015 | Wang et al. |

FOREIGN PATENT DOCUMENTS

| | | |
|---|---|---|
| JP | 2001045180 A | 2/2001 |
| JP | 2002152332 A | 5/2002 |
| JP | 2002344580 A | 11/2002 |
| JP | 2002538677 A | 11/2002 |
| JP | 2003134218 A | 5/2003 |
| JP | 2009528726 A | 8/2009 |
| JP | 2010243436 | 5/2012 |
| JP | 2012099894 A | 5/2012 |
| WO | 0051317 A1 | 8/2000 |
| WO | 2007098509 A1 | 8/2007 |

OTHER PUBLICATIONS

Office Action of the European Patent Office, Application No. 14165113.3-1216, dated Sep. 19, 2018, 5 Pages.
International Search Report, Application No. PCT/EP2015/058178, dated Jul. 16, 2015, 3 pages.
Video entitled "Meet Google Duo, a simple 1-to-1 video calling app for everyone"; Published Aug. 16, 2016; https://googleblog.blogspot.in/2016/08/meet-google-duo-simple-1-to-1-video.html.
Video entitled Saying hellow to Allo and Duo: new apps for smart messaging and video calling; Published May 18, 2016; https://googleblog.blogspot.in/2016/05/allo-duo-apps-messaging-video.html.
Patent Office of the Russian Federation, Office Action, Application No. 2016140625/07, dated Dec. 20, 2018, 7 pages, English Translation.
Patent Office of the Russian Federation, Search Report, Application No. 2016140625/07, dated Dec. 20, 2018, 2 pages, English Translation.
China National Intellectual Property Administration; Application No. 201580027888.9; Notification of the Second Office Action, dated May 14, 2019; 4 pages.
Japanese Patent Office; Notification of Reason for Refusal, Paper No. 143301, Patent Application No. 2016-562758; Patent Office Examiner: Noriyuki, Ishida, dated Apr. 9, 2019; Mailed to AIWA Internation Patent Agency; 4 pages (English Translation is 6 pages).
Japan Patent Office, Notification of Reason of Refusal, application No. 2016-562758, dated Mar. 3, 2020, 3 pages, English Translation Attached.

* cited by examiner

ADDITIONAL INFORMATION ON A CALLER

FIELD

The aspects of the disclosed embodiments relate to a connection establishment initiation from a first party to one or more second parties, and especially to delivering information on the first party to at least one of the one or more second parties.

BACKGROUND ART

In general, a telephone or a corresponding user apparatus that permits its user to communicate, for example conduct a conversation, over a connection with another user, is configured to provide its user with information on an initiator of a connection establishment, usually called a calling party, before the user decides whether or not to accept the connection establishment. Typically, the information is shown to the user via a display, during a ringing signal, or when the connection is being set up but before the user accepts the connection establishment. At the simplest the information shown may be caller identification, either a calling party's number, or a name retrieved using the calling party's number either from a phone book in a memory of the user apparatus, or from a database in the network. The breakthrough of smart phones and corresponding apparatus has increased the amount of different applications, including also applications (apps) with which more information on the calling party may be shown. For example, for apparatus having Android as an operating system, there is available for downloading an application that, when the user is connected with the calling party, outputs in addition to the name and number and a photo also links to social profiles, like profiles on Facebook and Twitter, and possibly information on calling party's location, and weather in the location. When the user is not connected with the calling party, name information is retrieved using publicly available number information, if available. Hence, even the application uses predetermined, pre-stored data to provide information relating to the calling party based on the calling party's number information. Further, the additional information requires that the user and the calling party have been previously connected, and that both also have profile accounts.

SUMMARY

A general aspect of the invention is to deliver some real-time or near-real-time information on a first party to one or more second parties with whom the first party tries to establish a connection, by means of a reference to a resource comprising the real-time or near-real-time information, the reference being given by the calling party or by sending the real-time or near-real-time information to the one or more second parties prior to establishing the connection.

In a first aspect, embodiments of the present disclosure provide a method for a called party apparatus, the method comprising:
 receiving a message, via a one-way connection from a calling party apparatus to the called party apparatus, the message indicating a two-way connection establishment request from the calling party apparatus, the message including content or a reference to a resource comprising the content;
 receiving the content from the calling party apparatus or retrieving the content from the resource;
 detecting whether or not the content is in a format that is not supported by the called party apparatus; and when it is detected that the content is in the format not supported by the called party apparatus, sending to the calling party apparatus a request indicating a format for the content that is supported by the called party apparatus;
 receiving, from the calling party apparatus, the content in the format supported by the called party apparatus, wherein the content in the format supported by the called party apparatus comprises real-time caller information identifying a user who initiated the two-way connection establishment request at the calling party apparatus, the real-time caller information being received from the calling party apparatus in a continuous manner;
 displaying the real-time caller information on a display of the called party apparatus;
 detecting a user input of an acceptance or a rejection of the two-way connection establishment request; and
 accepting or rejecting the two-way connection establishment request based on the detected user input.

In a second aspect, embodiments of the present disclosure provide a method for a calling party apparatus, the method comprising:
 detecting a user input indicating a request to establish a connection to a called party apparatus;
 sending a message, via a one-way connection from the calling party apparatus to the called party apparatus, the message indicating a two-way connection establishment request from the calling party apparatus, the message including content or a reference to a resource comprising the content;
 receiving, from the called party apparatus, a request indicating a format for the content that is supported by the called party apparatus, the request being received when the content is in a format that is not supported by the called party apparatus; and
 sending, to the called party apparatus or to the resource, the content in the format supported by the called party apparatus, wherein the content in the format supported by the called party apparatus comprises real-time caller information identifying a user who initiated the two-way connection establishment request at the calling party apparatus, the real-time caller information being sent from the calling party apparatus in a continuous manner.

In a third aspect, embodiments of the present disclosure provide a computer program product comprising a non-transitory machine-readable data storage medium having stored thereon program instructions that, when executed by a processor of a called party apparatus, cause the processor to:
 receive a message, via a one-way connection from a calling party apparatus to the called party apparatus, the message indicating a two-way connection establishment request from the calling party apparatus, the message including content or a reference to a resource comprising the content;
 receive the content from the calling party apparatus or retrieve the content from the resource;
 detect whether or not the content is in a format that is not supported by the called party apparatus; and when it is detected that the content is in the format not supported by the called party apparatus, send to the calling party apparatus a request indicating a format for the content that is supported by the called party apparatus;

receive, from the calling party apparatus, the content in the format supported by the called party apparatus, wherein the content in the format supported by the called party apparatus comprises real-time caller information identifying a user who initiated the two-way connection establishment request at the calling party apparatus, the real-time caller information being received from the calling party apparatus in a continuous manner;

display the real-time caller information on a display of the called party apparatus;

detect a user input of an acceptance or a rejection of the two-way connection establishment request; and accept or reject the two-way connection establishment request based on the detected user input.

In a fourth aspect, embodiments of the present disclosure provide a computer program product comprising a non-transitory machine-readable data storage medium having stored thereon program instructions that, when executed by a processor of a calling party apparatus, cause the processor to:

detect a user input indicating a request to establish a connection to a called party apparatus;

send a message, via a one-way connection from the calling party apparatus to the called party apparatus, the message indicating a two-way connection establishment request from the calling party apparatus, the message including content or a reference to a resource comprising the content;

receive, from the called party apparatus, a request indicating a format for the content that is supported by the called party apparatus, the request being received when the content is in a format that is not supported by the called party apparatus; and send, to the called party apparatus or to the resource, the content in the format supported by the called party apparatus, wherein the content in the format supported by the called party apparatus comprises real-time caller information identifying a user who initiated the two-way connection establishment request at the calling party apparatus, the real-time caller information being sent from the calling party apparatus in a continuous manner.

The invention is defined in methods, apparatus, a computer program product and a system which are characterized by what is stated in the independent claims. The preferred embodiments of the invention are disclosed in the dependent claims.

BRIEF DESCRIPTION OF THE DRAWINGS

In the following different embodiments will be described in greater detail with reference to the attached drawings, in which.

DETAILED DESCRIPTION OF SOME EMBODIMENTS

Figure 1:
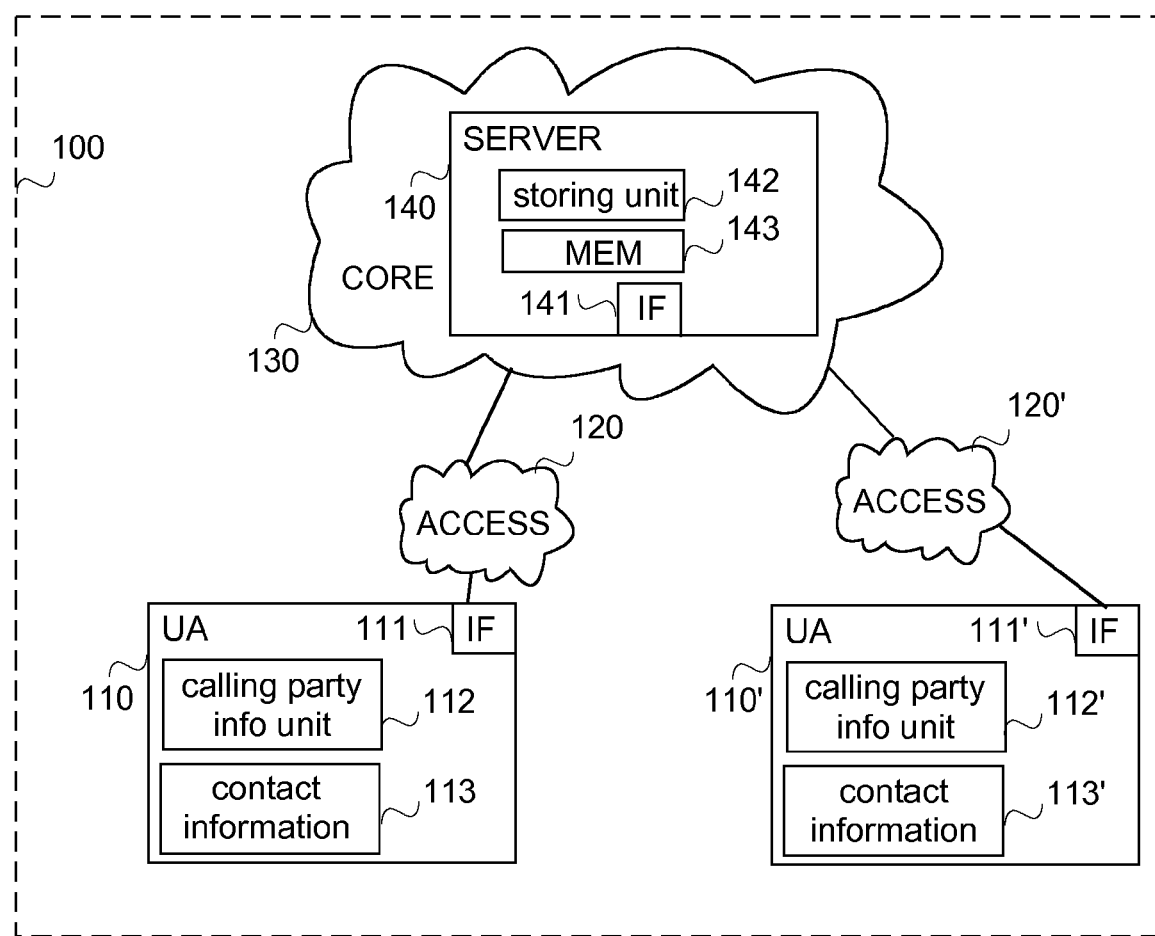
FIG. 1 shows a simplified architecture of a system and schematic diagrams of exemplary apparatuses.

The following embodiments are exemplary. Although the specification may refer to "an", "one", or "some" embodiment(s) in several locations, this does not necessarily mean that each such reference is related to the same embodiment(s), or that the feature only applies to a single embodiment. Single features of different embodiments may also be combined to provide other embodiments.

In a first aspect, embodiments of the present disclosure provide a method for a called party apparatus, the method comprising:

receiving a message, via a one-way connection from a calling party apparatus to the called party apparatus, the message indicating a two-way connection establishment request from the calling party apparatus, the message including content or a reference to a resource comprising the content;

receiving the content from the calling party apparatus or retrieving the content from the resource;

detecting whether or not the content is in a format that is not supported by the called party apparatus; and when it is detected that the content is in the format not supported by the called party apparatus, sending to the calling party apparatus a request indicating a format for the content that is supported by the called party apparatus;

receiving, from the calling party apparatus, the content in the format supported by the called party apparatus, wherein the content in the format supported by the called party apparatus comprises real-time caller information identifying a user who initiated the two-way connection establishment request at the calling party apparatus, the real-time caller information being received from the calling party apparatus in a continuous manner;

displaying the real-time caller information on a display of the called party apparatus;

detecting a user input of an acceptance or a rejection of the two-way connection establishment request; and accepting or rejecting the two-way connection establishment request based on the detected user input.

Optionally, in the method, the real-time caller information is captured at the calling party apparatus and is sent from the calling party apparatus to the called party apparatus within a certain time period after capture. Optionally, the certain time period is set to depend on an information type of the real-time caller information. Optionally, the information type is video.

Optionally, in the method, the real-time caller information is received using a Real-time Transport Protocol (RTP).

Optionally, the method further comprises releasing the one-way connection and establishing a two-way connection between the calling party apparatus and the called party apparatus when the two-way connection establishment request is accepted at the called party apparatus. Alternatively, optionally, the method further comprises upgrading the one-way connection to a two-way connection between the calling party apparatus and the called party apparatus when the two-way connection establishment request is accepted at the called party apparatus.

In a second aspect, embodiments of the present disclosure provide a method for a calling party apparatus, the method comprising:

detecting a user input indicating a request to establish a connection to a called party apparatus;

sending a message, via a one-way connection from the calling party apparatus to the called party apparatus, the message indicating a two-way connection establishment request from the calling party apparatus, the message including content or a reference to a resource comprising the content;

receiving, from the called party apparatus, a request indicating a format for the content that is supported by the called party apparatus, the request being received when the content is in a format that is not supported by the called party apparatus; and sending, to the called party apparatus or to the resource, the content in the format supported by the called party apparatus, wherein the content in the format supported by the called party apparatus comprises real-time caller information identifying a user who initiated the two-way connection establishment request at the calling party apparatus, the real-time caller information being sent from the calling party apparatus in a continuous manner.

Optionally, the method further comprises capturing the real-time caller information at the calling party apparatus, and sending the real-time caller information to the called party apparatus within a certain time period after capture. Optionally, the certain time period is set to depend on an information type of the real-time caller information. Optionally, the information type is video.

Optionally, in the method, the real-time caller information is sent using a Real-time Transport Protocol (RTP).

Optionally, the method further comprises releasing the one-way connection and establishing a two-way connection between the calling party apparatus and the called party apparatus when the two-way connection establishment request is accepted at the called party apparatus. Alternatively, optionally, the method further comprises upgrading the one-way connection to a two-way connection between the calling party apparatus and the called party apparatus when the two-way connection establishment request is accepted at the called party apparatus.

In a third aspect, embodiments of the present disclosure provide a computer program product comprising a non-transitory machine-readable data storage medium having stored thereon program instructions that, when executed by a processor of a called party apparatus, cause the processor to:

receive a message, via a one-way connection from a calling party apparatus to the called party apparatus, the message indicating a two-way connection establishment request from the calling party apparatus, the message including content or a reference to a resource comprising the content;

receive the content from the calling party apparatus or retrieve the content from the resource;

detect whether or not the content is in a format that is not supported by the called party apparatus; and when it is detected that the content is in the format not supported by the called party apparatus, send to the calling party apparatus a request indicating a format for the content that is supported by the called party apparatus;

receive, from the calling party apparatus, the content in the format supported by the called party apparatus, wherein the content in the format supported by the called party apparatus comprises real-time caller information identifying a user who initiated the two-way connection establishment request at the calling party apparatus, the real-time caller information being received from the calling party apparatus in a continuous manner;

display the real-time caller information on a display of the called party apparatus;

detect a user input of an acceptance or a rejection of the two-way connection establishment request; and accept or reject the two-way connection establishment request based on the detected user input.

In a fourth aspect, embodiments of the present disclosure provide a computer program product comprising a non-transitory machine-readable data storage medium having stored thereon program instructions that, when executed by a processor of a calling party apparatus, cause the processor to:

detect a user input indicating a request to establish a connection to a called party apparatus;

send a message, via a one-way connection from the calling party apparatus to the called party apparatus, the message indicating a two-way connection establishment request from the calling party apparatus, the message including content or a reference to a resource comprising the content;

receive, from the called party apparatus, a request indicating a format for the content that is supported by the called party apparatus, the request being received when the content is in a format that is not supported by the called party apparatus; and send, to the called party apparatus or to the resource, the content in the format supported by the called party apparatus, wherein the content in the format supported by the called party apparatus comprises real-time caller information identifying a user who initiated the two-way connection establishment request at the calling party apparatus, the real-time caller information being sent from the calling party apparatus in a continuous manner.

Optionally, the program instructions, when executed by the processor, cause the processor to capture the real-time caller information at the calling party apparatus, and to send the real-time caller information to the called party apparatus within a certain time period after capture. Optionally, the certain time period is set to depend on an information type of the real-time caller information. Optionally, the information type is video.

Optionally, the real-time caller information is sent using a Real-time Transport Protocol (RTP).

Embodiments of present invention are applicable to any apparatus configured to be used in a communication system and to support displaying information to its user on a calling party. The communication system may be a wireless communication system or a communication system utilizing both one or more fixed networks and one or more wireless networks. The protocols used and the specifications of communication, especially in wireless communication, develop rapidly. Such development may require extra changes to an embodiment. Therefore, all words and expressions should be interpreted broadly and are intended to illustrate, not to restrict, the embodiment.

A general architecture of a system 100 according to an exemplary embodiment is illustrated in FIG. 1. FIG. 1 is a highly simplified system architecture only showing some elements and functional entities, all being logical units whose implementation may differ from what is shown. The connections shown in FIG. 1 are examples of logical connections; the actual physical connections may be different. It is apparent to a person skilled in the art that the systems also comprise other functions, structures and apparatuses. It should be appreciated that the functions, structures, elements and the protocols used in or for establishing a connection and transmitting different media formats over the connection, and the amount of actual channels needed for the connection are irrelevant to the actual invention. Therefore, they need not to be discussed in more detail here.

The exemplary system 100 illustrated in FIG. 1 comprises one or more user apparatuses 110, 110' (only two shown in FIG. 1), connected via access networks 120, 120' to a core network 130 comprising one or more server apparatuses (or to a server system) 140 comprising resources for caller information.

One or more of the access networks 120, 120' and the core network 130 may be a mobile network, a public switched telephone network, a wide area network WAN, Internet, a local area network LAN open for all users or with restricted access (an enterprise LAN or office LAN, for example), Wireless LAN, like Wi-Fi, a private network, a proprietary network or any combination thereof. However, as said above, the type(s) and system(s) on which the network is based, bears no significance, and any type of a network/connection over which user data can be transmitted, can be used.

In FIG. 1, only some units for the user apparatus 110, 110' are illustrated. The user apparatus 110, 110' may be any kind of a computing apparatus that can act as an end point for a communication and supports communications over one or more networks, and it may be referred to as a user terminal or user equipment or a user device. Examples of such user apparatus include portable wireless mobile communication devices operating with or without a subscriber identification module (SIM) in hardware or in software, including, but not limited to, the following types of devices: a mobile phone, a smart phone, a personal digital assistant (PDA), a handset, a laptop computer, an e-reading device, a tablet, a mobile device dedicated for the service. Further, it should be appreciated that any kind of operating system may be used. Examples of such operating systems include Android, iOS, Windows, and OSX. In addition, any application, based on any programming language, including operation system independent languages, may be supported, such as Java, HTML (HyperText Markup Language), HTML5, ActionScript ("Flash") and QT (a cross-platform application framework) based applications. In the illustrated example, the user apparatus 110, 110' comprises a calling party information unit 112, 112' for delivering real-time or near-real-time information on the user, called below "real-time caller information" or simply "caller information" and for outputting real-time caller information on a calling party. When pull principles are used, the calling party information unit 112, 112' is for delivering a reference to a resource comprising the caller information, and for controlling that the caller information is delivered to the resource, when a connection establishment with a reference is initiated by the user and for obtaining/retrieving the caller information on the calling party to be displayed to the user when a connection establishment request with a reference is received, as will be described in more detail below. When push principles are used, the calling party information unit 112, 112' is for delivering the caller information, which may be called a uniform caller information UCI, either with a connection establishment request or substantially immediately after the connection establishment request, and if UCI is not transmitted with the connection establishment request, for controlling that the caller information is delivered to the called party, when a connection establishment with UCI is initiated by the user and for obtaining/retrieving the caller information on the calling party to be displayed to the user when a connection establishment request with UCI or followed by UCI is received, as will be described in more detail below. It should be appreciated that UCI, as non-reusable, real-time information can not be the same as the reused caller identification, although UCI may comprise the caller identification as one piece of UCI. The calling party information unit 112, 112' may be configured to implement only the pull principles, only the push principles or both principles. The user apparatus 110, 110' comprises also one or more different interface units 111, 111' for communications, such as one or more antennas for sending and receiving different media types and different user interface units, such as one or more screens (remote or integrated), one or more speakers (remote or integrated), one or more cameras (remote or integrated), a touch screen, a switch, a keyboard, a virtual keyboard, a mouse, a joystick, a selector roller, a choice wheeler, a selector switch, a drawing pad, a touch pad, etc. However, they are not illustrated in detail here. The user apparatus 110, 110' comprises also one or more memories 113, 113' that may be used for storing contact information, for example. The memory may also comprise settings and/or rules and/or profiles and/or additional information associated with the contact information for the calling party information unit, depending on implementation details of the calling party unit. For example, the additional information may be a name of a user who has an unlisted number or has a prepaid account, or the additional information may be a text describing the organization and/or reason for calling, such as "I am working in telemarketing company xyz and calling to tell you about a very attractive offer on magazine xxx", or some measured data, such as location, temperature, wind speed, atmospheric pressure, electrocardiogram, and alcohol content in breath. Different examples of the settings, rules, profiles (a profile is a set of settings) and further examples of additional information will be described below without restricting them to the examples.

In FIG. 1, only some units for one server apparatus 140 are illustrated. The server apparatus 140 may be any kind of a computing apparatus that can be accessed by user apparatus having proper access rights, or by all user apparatus, and which can help to deliver previously stored caller information and/or the real-time or near-real-time caller information, and it may be referred to as a server or a server system. In other words, the server apparatus 140 may be any general purpose apparatus (device) programmable or otherwise configurable to carry out dedicated resource sharing to one or more clients, a client being either a remote client in another apparatus or an internal client in the server apparatus. For example, the server apparatus 140 may be a computer or other computing component, like a web server or a media server or an authentication server or a trusted third party server for verifying an identity of a calling party. In the illustrated example, the server apparatus 140 comprises one or more interfaces 141, at least one storing unit 142 and at least one memory 143 for temporary storing the previously used caller information and/or the real-time or near-real-time caller information and/or for storing additional information to services provided by the server. Examples of such additional information include verification information needed to verify a user, or authentication information needed to authenticate a user. For example, the server may be configured to perform a facial recognition on the basis of a photo received, and then store identity information, like name, gender and/or age with the photo, in a resource, and thereby provide information for final verification or authentication of the calling party. It should be appreciated that where the server apparatus locates bears no significance for the invention. The server apparatus may locate in an access network, for example. It suffices that it is accessible by the user apparatus, if the server apparatus is used as a caller information mediator. In an implementation, the system is a kind of centralized system, i.e. a system in which the caller information is always delivered via the server system (which may be a dedicated system for that purpose). In implementation based on a centralized system, each user apparatus, or more precisely each client, establishes a connection to a centralized server, not to another user apparatus, and the server maps the connections so that the end users experience the connection as an end-to-end user apparatus connection. In another implementation, the system is a decentralized system, in which the server via which the caller information is delivered may be freely selected, including an option to use the calling party's user apparatus as a server for the caller information. However, there are implementations in which no server apparatus is involved in the delivery of the caller information.

The previously stored caller information is information captured beforehand to be used once with a call establishment. Any means to ensure that the previously stored caller information is used only once may be used. The previously stored caller information may be deleted when it is obtained/retrieved, or marked/flagged as used, for example. The previously stored caller information may be associated with a certain lifetime and if the lifetime expires, the information cannot be used. The previously stored caller information may be a picture of the user and/or a text message and/or a voice message. It should be appreciated that these are only examples and any kind of information may be used.

The real-time information or near-real-time information is by nature one-time information. The real-time information or near-real-time information may be an image stream, video stream and/or audio stream from the calling party's user apparatus and/or some identifying/individual data measured by a measurement unit/device/sensor integrated or otherwise connected to the calling party's user apparatus, and/or an image captured by a camera integrated or otherwise connected to the calling party's user apparatus. Examples of identifying measured data, i.e. information enabling identification of the calling party, also called individual information by means of which the calling party is identifiable, include a finger print, an iris print, a facial image, and voice. It should be appreciated that the above list is not an exhaustive list, and also other information may be used as the real time or near-real time information; it suffices that the information is captured, under control of the user, by the user apparatus, or by another apparatus/device/means integrated or otherwise connected to the calling party's user apparatus. The expression "under control of the user" means herein, that the user is aware of what information is sent, and thereby can decide not to send it (although that may necessitate ending of the call) and that the information is captured for connection establishment, preferably, but not necessary, for the connection establishment request the information is used. The real-time or near-real time information means herein information that is captured and used within a certain time period after it is captured. For example, the time period may set to be 15 minutes. The time period may be set to depend on the information type used. For example, the time period may be 15 seconds for video, 25 seconds for audio, 15 minutes for a photo, and 2 minutes for other identifying measured data. Another example includes 20 seconds for video and audio and 15 minutes for others. Although the time period within which the information has to be used may be freely set, in order to guarantee real-time characteristics of the information, the time period should not be too long. For example, 15 minutes as a maximum upper limit is a reasonable limit.

Below the term real-time information covers also the near-realtime information.

Below a call is used as an example of a connection establishment, and an URI (uniform resource identifier) as an example of a reference to a resource when the caller information is delivered using the pull principles. URI is a compact sequence of characters that identifies an abstract or physical resource by an unambiguous reference to resources available over one or more networks. In other words, URI is used as an example of a pointer to the caller information. Instead of URI an identifier, other than the one used in the connection establishment request to indicate the calling party for purpose of routing a response back to the calling party, may be used. Further, if the calling party uses another system or application than the called party, such as a flash client and a m4y client, it may be necessary to bridge different pointers so that the called party's client can obtain the calling party's caller information. When the centralized server, to which the connections end and which map the connections, is implemented, the reference to the resource may be the combination of the caller identification and the calling party identification. However, it should be appreciated that even in the case URI may be used. It is also apparent to a person skilled in the art that when the caller information is delivered using the push principles, no reference is needed but UCI is delivered with the connection establishment request or substantially immediately after the connection establishment request.

Figure 2:
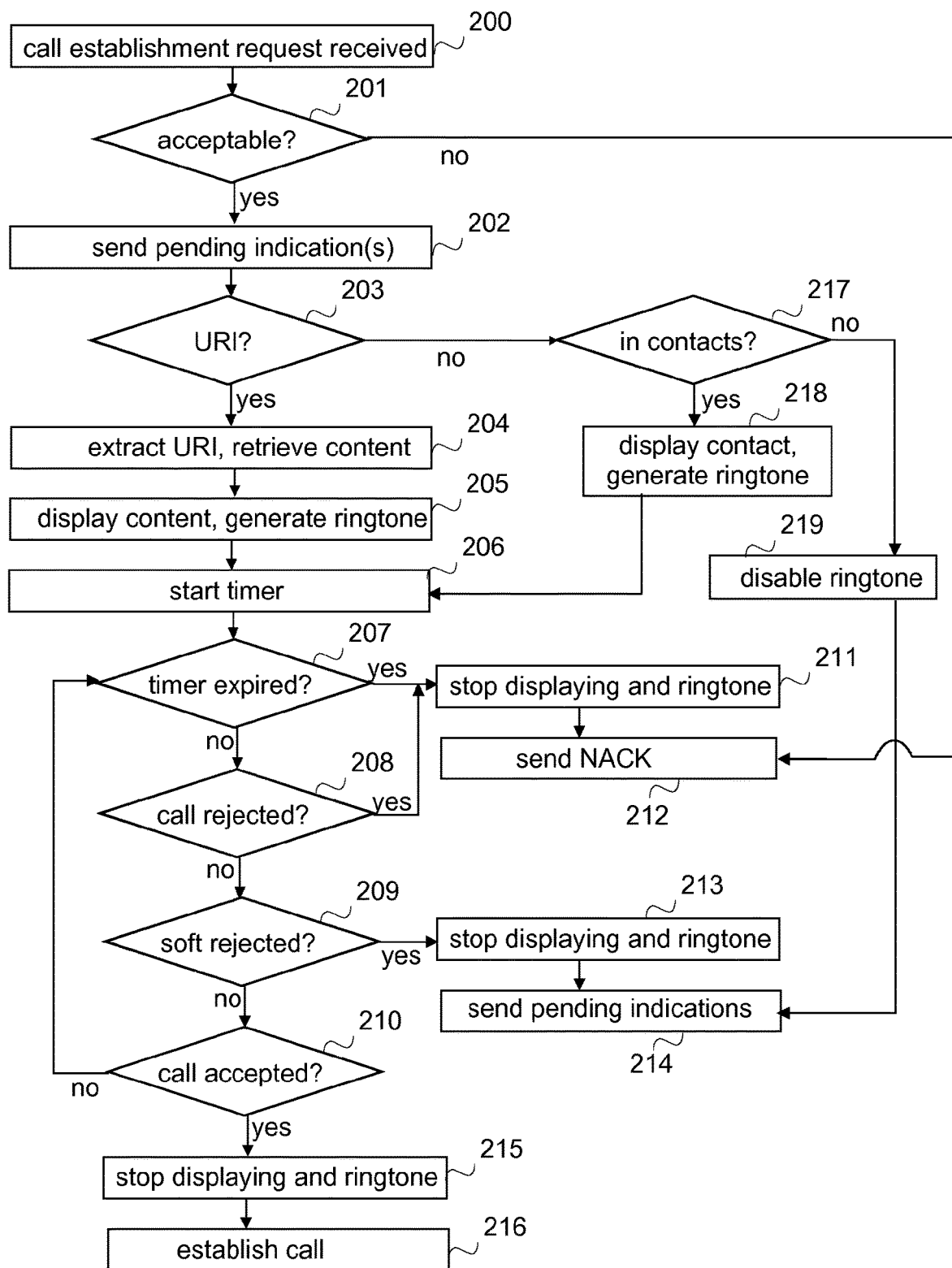
FIGS. 2 and 3 are flow charts illustrating examples of a network apparatus functionality.

FIG. 2 is a flow chart illustrating an exemplary functionality of a called party's user apparatus, or more precisely an exemplary functionality of the calling party identification unit when a connection establishment request is received. In the example of FIG. 2, the user has defined that if a connection establishment request without an URI is received and the calling party is not in the contact list, the user is not alerted, otherwise the user is alerted by playing a ringtone. Further, it is assumed that the caller information is outputted to the user by displaying the caller information. It should be appreciated that other ways to output the content (the caller information) may be used as well. For example, text information may be read by a voice generator.

When a call establishment request is received in step 200, in the illustrated example it is checked in step 201, whether or not the call establishment request is acceptable. For example, the settings or configurations may require certain capabilities from the calling user apparatus, such as use of the same application. However, the checking of step 201 may be omitted in other implementations.

If the call establishment request is acceptable (step 201), the request is acknowledged as pending by sending in step 202 a corresponding message indicating the pending status towards the calling party. It should be appreciated that when the call establishment protocol does not need periodic "pending indications", step 202 is omitted. When the calling party's user apparatus receives the message (indication), the calling party hears "alerting" or "ringing". However, no ringing tone is generated in the called party's user apparatus at the moment in the example. It is then checked in step 203, whether or not the call establishment invitation contains an URI. If it does, URI is extracted in step 204 from the request, and a connection is set up in step 204 to a resource pointed by URI to retrieve content in the resource. The content may be a recent photo, a recent photo with additional text, or a video-stream originating from the calling party's user apparatus, for example. The content is then displayed in step 205 to the called party and a ringtone is generated in step 205. Naturally, if the user apparatus is on silent mode, no ringing tone is outputted. The content may be displayed on the user apparatus's display, on a separately attached device, or be processed by an attached computer with appropriate interface hardware, or on a television screen.

Then a timer is set on step 206, and it is monitored whether or not the timer expires (step 207), whether or not the call is rejected (step 208) by the user or whether or not the call is soft rejected (step 209) by the user or whether or not the call is accepted by the user (step 210).

If the timer expires (step 207) or the call is rejected (step 208) the displaying and ringtone generation is stopped in step 211 and a negative acknowledgement to the call establishment request is sent in step 212. Hence, the purpose of the timer is to ensure that if the calling party is patient and does not hang up (as it is assumed in the example illustrated in FIG. 2), and the user does not either react to the alerting, the alerting will not continue forever.

If the call is soft rejected (step 209), the displaying and ringtone generation is stopped in step 213 so that the user apparatus considers the call establishment as rejected but that is not informed to the calling party's user apparatus. Therefore, in step 214 sending messages acknowledging the call establishment request as a pending one is continued until the calling party gives up. It should be appreciated that when the call establishment protocol does not need periodic "pending indications", step 214 is omitted. In other words, in the illustrated example, a soft rejection means that the call establishment is rejected, and hence the called party's user apparatus is able to receive and send a new call establishment request, but no negative acknowledgement to the call establishment request received in step 200 is sent to the calling party's user apparatus. Hence the calling party assumes that the call establishment request is still pending. It should be appreciated that in another example, the soft rejecting may just stop the displaying and ringtone generation (i.e. set the user apparatus temporarily to a silent mode).

If the call is accepted, the displaying and ringtone generation is stopped in step 215 and the call establishment is continued in step 216. If the call establishment request indicated a video call, the call may be established as an audio call or a video call, based on the user's selection when the call was accepted. However, since the invention does not necessitate changes to the actual call establishment, it is not described in more detail here.

If the call establishment invitation does not contain an URI (step 203) it is checked in step 217, whether or not the calling party's number is found in a contact list of the user. If it does, the information obtainable by means of the contact list is displayed in step 218 to the user of the user apparatus and a ringtone is generated in step 218. Naturally, if the user apparatus is on silent mode, no ringing tone is outputted. Then the process proceeds to step 206 to set the timer.

If the calling party's number is not in the contact list (step 217), the generation of the ringing tone is disabled in step 219 and the process proceeds to step 214 to continue sending messages acknowledging the establishment request as a pending one until the calling party hangs up. It should be appreciated that if the alerting settings do not automatically trigger generation of the alerting, or assume that something is to be performed to the alerting, step 219 may be omitted.

In another implementation, in step 215 only generating the ringtone is stopped and the displaying of the content is continued unless the user inputs an instruction to stop the displaying. In the implementation, if the call is a video call, the content may be displayed using another screen than what is used for the video call.

In a further implementation, if there is no URI in the request and the calling party is not in the contact list, the process proceeds from step 219 (or from step 217, if step 219 is omitted) directly to step 212, i.e. it is not waited until the calling party hangs up, or alternatively a timer may be set, upon expiry of which the process proceeds to step 212. The timer may have the same waiting time as the one monitored in step 207, or another time.

In yet another implementation the soft rejection is provided with a timer, the expiry of which causes the process to proceed from step 214 to step 212 to send a negative acknowledge if the calling party is very patient and does not hang up. The timer may have the same waiting time as one of the above timers, or another. In the implementation, if there is no URI in the request and the calling party is not in the contact list, any of the processes described herein may be used.

In yet another implementation no soft rejection is provided. In the embodiment, steps 209 and 213 are omitted, and from step 217, i.e. if there is no URI in the request and the calling party is not in the contact list, the process proceeds to step 212 to send a negative acknowledgement to the call establishment request.

If the calling party's number is not in a contact list (step 217), it is also possible to check, whether or not the calling party's number is in a list of "blocked calling parties". If the calling party's number is in the list of "blocked calling parties", the generation of the ringing tone is disabled in step 219 and the process proceeds to step 214 or to step 212, or if step 219 is omitted, the process proceeds directly to step 214 or to step 212. However, if the calling party's number is not in the list of "blocked calling parties", a ringtone is generated and the number is displayed and the process proceeds to step 206 to start the timer. It is also possible to first check the list of "blocked calling parties", and if not found on the list, then the contact lists. Yet another alternative is to check only the list of "blocked calling parties". An advantage of these alternatives is that the called party receives information that someone is calling, but the called party is not informed on/disturbed by calls from blocked calling parties.

If the call establishment request is not acceptable (step 201), in the illustrated example the process proceeds to step 212 to send a negative acknowledgement to the call establishment request. It should be appreciated that any other way to handle the call establishment request may be used as well.

As is evident from the above, there is no need to the calling party and the called party to be previously connected to each other, or the called party to have any information on the calling party; the caller information is available if the calling party's user apparatus adds, either automatically or in response to a user input, URI to the request. Further, another advantage is that since the caller information displayed to the called party is not tied to the calling party's contact information, like a telephone number, the calling party can maintain his contact information secret and yet to be identified to the called party.

Figure 3:
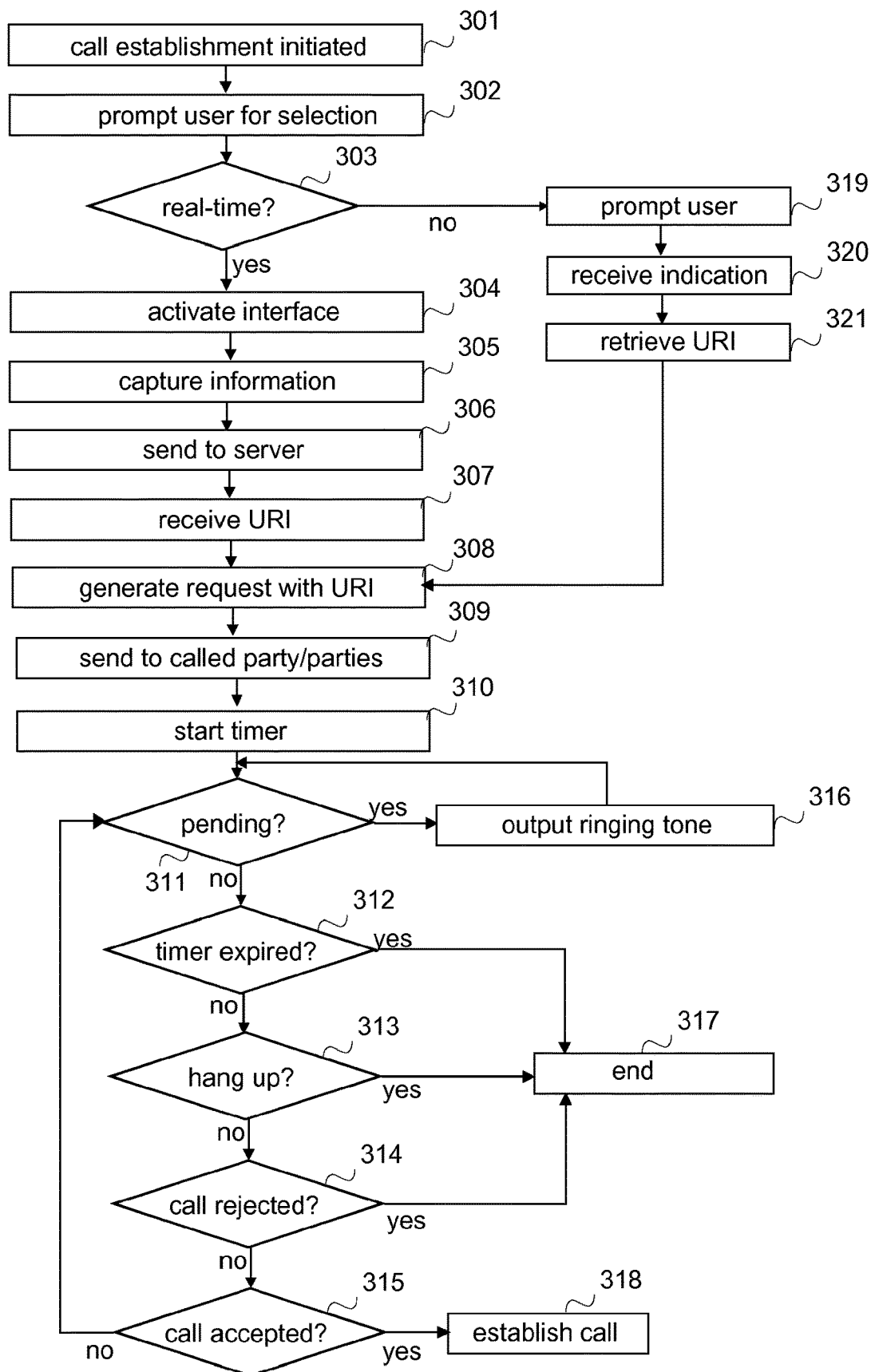

FIG. 3 is a flow chart illustrating an exemplary functionality of a calling party's user apparatus, or more precisely an exemplary functionality of the calling party identification unit when a connection establishment request is initiated. In the example of FIG. 3, the user settings are set so that different alternatives for the caller information may be selected each time a call establishment is triggered. It should be appreciated that the caller information may be set to be always of one type, such as a video, or it may be associated with the called number as part of the contact information in which case a default type is used or alternatives shown for numbers not included in the contact information.

When a user input indicating a call establishment is detected (step 301), the user is prompted in step 302 to input information what is to be sent as the caller information. For example, different alternatives, such as "use recently stored information", "send video", "a new captured image", "measured data", and "identity verification" may be displayed to the user. It should be appreciated that any amount of alternatives may be provided and the above examples are mere examples, not an exhaustive list. The basic difference between the alternatives in this example is that an alternative is either stored in advance, in the illustrated example to the user apparatus, or the alternative is actual real-time information that needs to be obtained by corresponding means configured to obtain the information in question or information wherefrom the information may be deduced, and then, in the illustrated example, the information needs to be delivered to a server acting as the caller information mediator. The server used may depend on what is to be send as the caller information or what are the settings in use. For example, the settings may be that "server 1" is used for video streams, "server 2" for deducing information from the captured information, unless profile including a setting "use server X" is the selected profile in the user apparatus. It is also possible to define that the user apparatus itself is used as a server in certain profiles or if no other server is defined in a profile settings. Hence, there are no restrictions what server is used and how the server is selected.

When the user selection is received, it is determined in step 303 whether the selection indicated real-time information. If the user selected to deliver the real-time information, devices/units/interfaces/sensors relating to the selected information are activated in step 304, the information is captured in step 305, and sent to the server in step 306 for temporary storage and/or for further processing. It should be appreciated that if the user apparatus itself is the server, the sending to server means storing at least temporarily to a storage area in the memory of the user apparatus. Depending on the selected information, the capturing and sending may be an isolated step or continuing in the background. For example, capturing a photo of the user and sending it is an isolated step but sending a video stream is a continuous step. Depending on an implementation, the continuous capturing and sending may be continued until the call is established or it is determined that the call will not be established or until an established call is ended or in response to receiving a user input indicating to stop the capturing and sending. These steps are not illustrated in FIG. 3 for the sake of clarity. In step 307 URI is received from the server, URI indicating the resource whereto the content, i.e. the captured information or information deduced based on the captured information, is stored.

When URI is received, a call establishment request is generated in step 308 and URI is added in step 308 to the call establishment request, which is then sent in step 309 to one or more called parties. For the sake of clarity, herein it is assumed that the call establishment request is sent to only one party.

Then in step 310 a timer is started and it is monitored whether a message indicating the request as a pending one is received (step 311), whether or not the timer expires (step 312), whether or not the user hangs up (step 313), whether or not a rejection to the call establishment request is received (step 314) or whether or not an acceptance to the call establishment request is received (step 315).

If the message indicating the request as a pending one is received (step 311), a ringing tone is outputted to the user in step 316, and then the monitoring continues.

If the timer expires (step 311) or if the user hangs up (step 312) or if the rejection is received (step 313), the process is ended in step 317.

If the acceptance is received (step 315), the call establishment is continued in step 318. However, since the invention does not necessitate changes to the actual call establishment, it is not described in more detail here.

If the user selected to deliver the information stored in advance (step 303), the user is prompted in step 319 to indicate information (content) to be sent, for example by browsing. In the implementation it is assumed that the information stored in advance for this purpose has a lifetime, and is not usable (indicatable) after the expiry. Once the user indication is received in step 320, URI related to the indicated information is retrieved in step 321 and then the process continues to step 308 to generate the request with URI.

In another implementation it may be checked before step 321, whether or not the information the user indicated is fresh enough, and if the information is too old, the user is prompted again.

In a still another implementation all alternatives provided are actual real-time alternatives, and therefore steps 303 and 319 to 321 are omitted.

As is evident from the above, the possibility to provide real-time information, like a just taken photo from the caller or the video stream, ensures that even when a calling party uses someone else's user apparatus he or she can be identified easily by the called party, or if the called party is busy and does not want to be interrupted his or her attention is nevertheless obtained by a video wherefrom an emergency situation or a frantic calling party is obvious.

In another implementation, for example if the caller information is preset to be one of the alternatives, the user may be prompted to provide the information, thereby implicitly accepting that the information is sent, or prompted that the information capture begins, thereby providing the user a possibility to end the call establishment if he/she does not accept that the information is sent, or the user is not informed at all, in which case the user may have accepted that information is sent by calling with the application, or by starting to use the user apparatus and/or by taking into use a profile having in its settings "do not inform me about caller information delivery".

FIGS. 4 to 9 are signalling charts illustrating other examples. Since any suitable protocol may be used to deliver the information needed, the signalling charts illustrate information exchange in a general level. Examples of suitable protocols include HTTP (Hypertext Transfer Protocol), RTHTTP (Real Time HTTP, as described in a patent application GB 1307340.8 filed on 23 Apr. 2013), SIP (Session Initiation Protocol), SDP (Session Description Protocol) RTP (Real-time Transport Protocol), RTCP (RTP Control Protocol), RTMP (Real Time Messaging Protocol), any variations of RTMP, like RTMPT, which is encapsulated within HTTP requests to traverse firewalls, and Skype Protocol. It should be appreciated that other protocols may be used as well, including new protocols and standards that are still being defined. Further, upon reading the description, persons skilled in the art are able to implement the functionality described herein with any suitable protocol and/or standard that exist or are developed in the future. Further, it should be appreciated that the protocol used for the call establishment may be different than, or the same as, the protocol used for the caller information delivery.

For the sake of clarity, in the examples below the call is between two parties. Implementation of the same principles to group calls or conference calls, i.e. to calls having three or more participants, is a straightforward measure for one skilled in the art.

Figure 4:
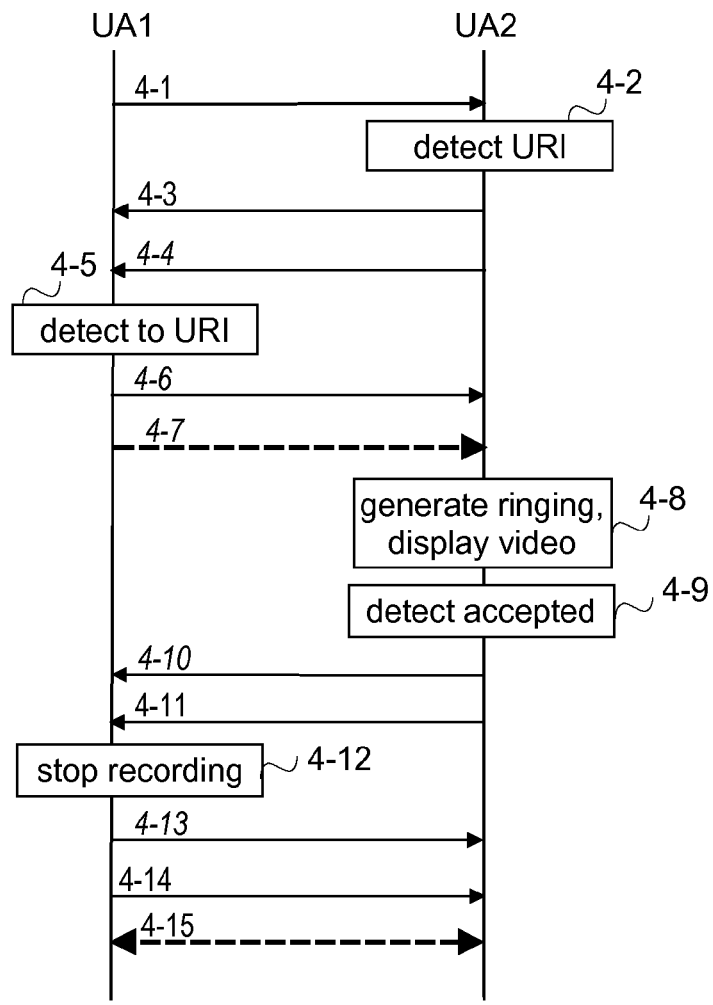
FIGS. 4 to 11 illustrate signalling according to different examples.
Figure 5:
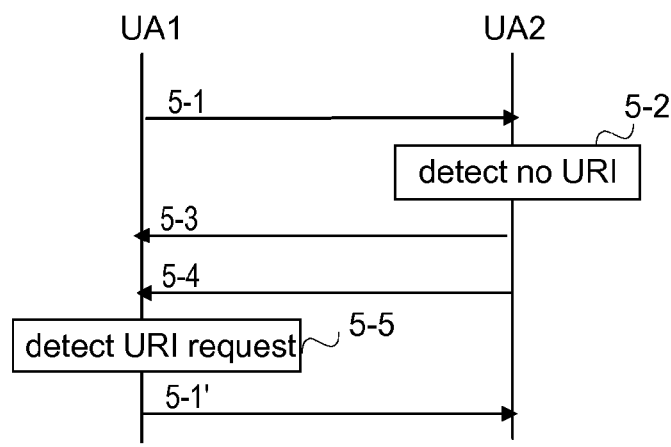

In the example of FIGS. 4 and 5 it is assumed that the caller information is a video stream delivered directly from Alice's user apparatus UA1 and that UA1 contains an address to Bob, or to a user apparatus UA2 used by Bob.

Referring to FIG. 4, Alice has inputted to her user apparatus UA1 that she wants to call to Bob. Therefore, UA1 sends to UA2 message 4-1 which is a call establishment message containing a calling party address, a called party address, URI as a pointer to additional information relating to the call, and in the illustrated example media definitions for an audio call and for a video call and other information. An example of the message 4-1 is a SIP INVITE comprising for URI an additional field "u" which is defined in SDP to be used for transmitting a pointer to additional information relating to the session. Another example is HTTP call request containing in its body URI. Using URI to point to the caller information has the advantage that caller information may be delivered operation system—independently and that the caller information can be delivered without it depending on the calling party's address information.

UA2 detects in point 4-2 that message 4-1 contains URI. Therefore, UA2, although sending a normal response to the call establishment message, in messages 4-3 to UA1, does not generate a ringing tone yet. However, it should be appreciated that in another implementation, no message 4-3 is sent. In response to detecting URI, UA2 establishes a connection to a resource indicated by URI to obtain the information. In the illustrated example this is performed by sending a connection establishment message 4-4 to the resource that is a storage area whereto the video is stored at least temporarily. Since URI indicated UA1, message 4-4 is a message targeted to UA1 and contains the URI.

In response to detecting in point 4-5 a connection establishment request to a resource within UA1, UA1 sends message 4-6 accepting the connection to the resource and the content is forwarded from UA1 to UA2 in messages 4-7 (only the first message is shown in FIG. 4). In the example it is assumed that the content is a video stream. Messages 4-7 form a kind of a unicast video conference. In response to receiving the caller information, UA2 generates in point 4-8 a ringing tone and displays the video stream to Bob. In point 4-9 UA2 detects that Bob answers the call. In the illustrated example UA2 is configured to end the connection established for the caller information by sending message 4-10. Further, UA2 sends message 4-11 indicating that Bob answered to Alice's call. It should be appreciated that in other implementations message 4-10 is not sent but message 4-11 may be interpreted to indicate the same information, i.e. the connection established for the caller information delivery is released when the connection for the call is established, or messages 4-7 may be sent as long as the actual call is going on.

In response to message 4-10, UA1 acknowledges it by message 4-13 and stops in point 4-12 delivering video stream via the connection established for the caller information delivery. Further, since the call was accepted (message 4-11), UA1 acknowledges call acceptance by sending message 4-14, and a bi-directional media stream 4-15 is established between Alice and Bob. The media stream 4-15 may be an audio stream and/or a video stream.

It should be appreciated that instead of sending message 4-10, UA2 may be configured to stop sending acknowledgements (not illustrated in FIG. 4) for the one way caller information delivered in messages 4-7. Further, UA2 may be configured to stop displaying the video immediately in response to detecting (point 4-9) that Bob accepted Alice's call. A further alternative is that UA1 is configured to interpret message 4-11 as an implicit message 4-10 in which case messages 4-10 and 4-13 are not sent.

To summon up the example of FIG. 4, while a two-way connection establishment is pending, a one way connection from the caller to the called is established (italics in FIG. 4), the one way connection being released at the latest, when the two-way connection is established. It should be appreciated that in some other implementation the one way media connection may be upgraded to the two way media connection.

FIG. 5 illustrates signalling in a similar situation like FIG. 4. Alice has inputted to her user apparatus UA1 that she wants to call to Bob. Therefore, UA1 sends to UA2 message 5-1 which is a call establishment message containing a calling party address, a called party address, and in the illustrated example media definitions for an audio call and for a video call and other information. However, unlike message 4-1 in FIG. 4, message 5-1 does not contain URI.

UA2 detects in point 5-2 that message 5-1 contains no URI. However, Bob's settings require the caller information. Therefore, UA2, although sending a normal response to the call establishment message in messages 5-3 to UA1, sends to UA1 a caller information request in message 5-4.

UA1 detects in point 5-5 that the caller information, or more precisely information where the caller information can be obtained, is requested. UA1 checks from Alice's settings whether or not a caller information delivery is authorized by Alice. In the illustrated example it is assumed that Alice has accepted the caller information delivery. Therefore, UA1 adds URI to original message 5-1, and sends to UA2 message 5-1', message corresponding to the message 5-1 described above. Therefrom the procedure continues as described with FIG. 4, and hence is not repeated in vain here.

As can be seen from the examples of FIGS. 4 and 5, the call establishment takes less time and uses less network resources, if the calling party's user apparatus adds URI to the call establishment message the without any specific request from the called party's user apparatus. By doing so, messages 5-3, 5-4 and 5-1' and point 5-5 are avoided. However, by messages 5-4 and 5-1' and point 5-5 it is ensured that the caller information is in format the called party's user apparatus or the subscription supports. In other words, if URI is in message 5-1, UA2 may detect in point 5-2 that it does not support the format of the caller information, the format being indicated by URI, and therefore sends message 5-4 indicating a format UA2 supports.

Figure 6:
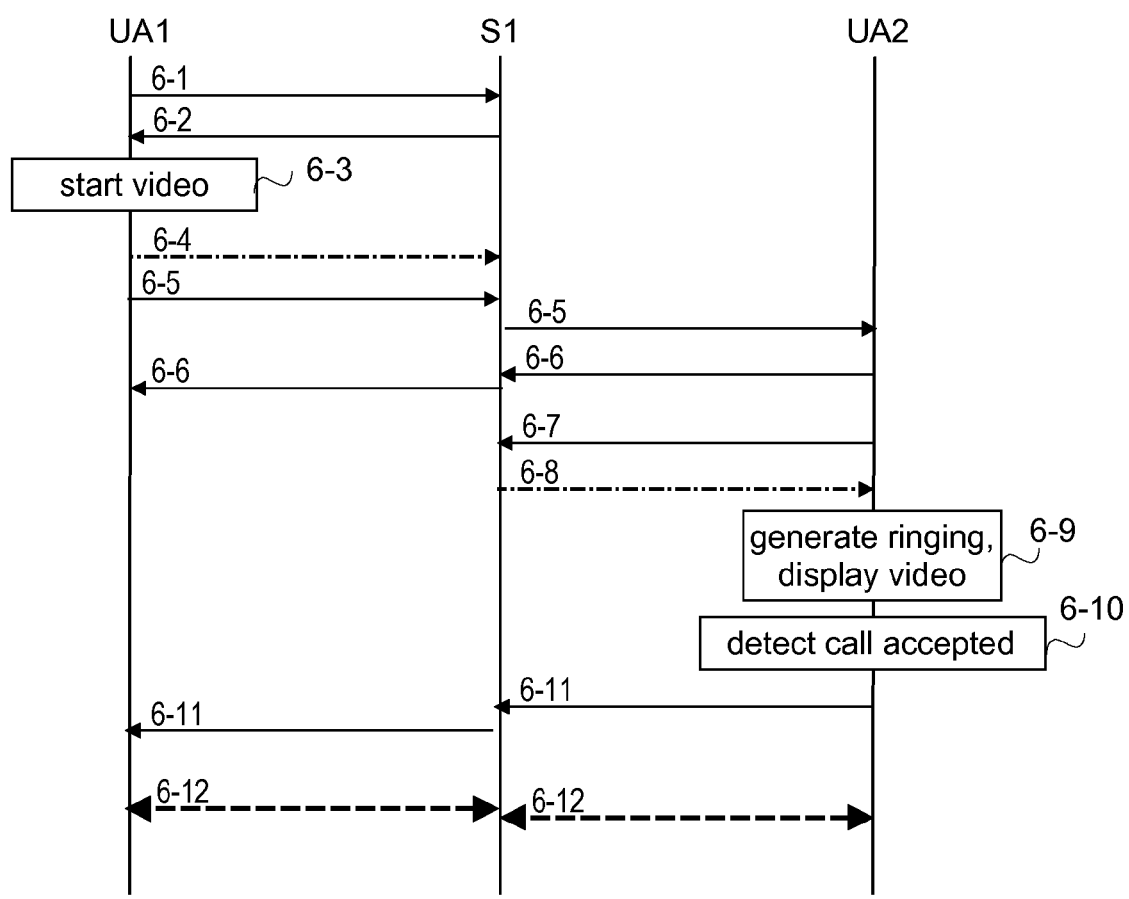

FIG. 6 illustrates signalling in a centralized system in which caller information is always delivered via a server S1 that is configured to store the caller information only a very short time, such as milliseconds, in order to secure that the information fulfils the criteria of real-time or near-real-time. In the example of FIG. 6 it is assumed that the caller information is a video stream, Alice's user apparatus UA1 contains an address to Bob, or to a user apparatus UA2 used by Bob, and that the settings in the Alice's user apparatus indicate that the caller information is always delivered when Alice selects to call someone.

Referring to FIG. 6, Alice has inputted to her user apparatus UA1 that she wants to call to Bob. To deliver the caller information, which according to Alice's settings is to be delivered, UA1 sends to S1 message 6-1, which is a message requesting a connection for delivering the caller information. S1 responds by message 6-2, which is a message accepting the connection for the caller information and indicating an address to where send the caller information. The address may be an address that is also usable for the actual call. UA1 starts in point 6-3 to capture the video which UA1 pushes, after receiving the address, in a video stream 6-4 to S1. It should be appreciated that UA1 may start to capture the video immediately in response to detecting that Alice wants to call, or in response to receiving the address, or in any time between the abovementioned times.

After receiving URI, UA1 sends to UA2 through S1 message 6-5 which is a call establishment message that contains a calling party address, a called party address, as a pointer to additional information relating to the call the address indicated in message 6-2, and in the illustrated example media definitions for an audio call and for a video call and other information. UA2 acknowledges message 6-5 by sending message 6-6 through S1 to UA1 (which then may start to output a sound so that Alice thinks Bob's user apparatus is alerting/ringing). In response to URI in message 6-5, UA2 sends to S1 message 6-7, which is indicating a pull request to content behind URI, the content being received in messages 6-8.

In response to receiving the caller information, UA2 generates in point 6-9 a ringing tone and displays the video stream to Bob. In point 6-10 UA2 detects that Bob answers the call and therefore UA2 sends to UA1 through S1 message 6-11, which is a message indicating that Bob answered to Alice's call. Then the actual call content is delivered in messages 6-12 between UA1 and UA2, either through S1 (as is illustrated in FIG. 6), or without messages 6-12 passing through S1.

Figure 7:
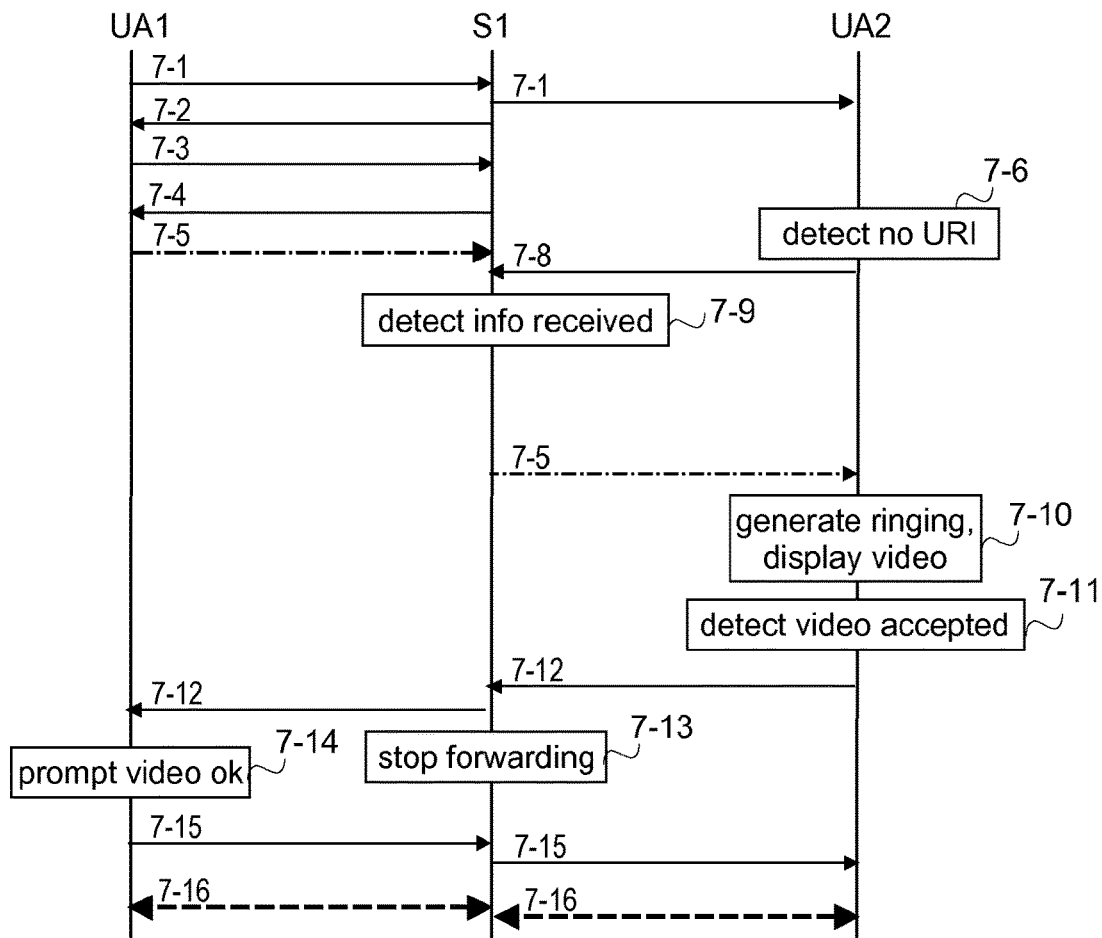
Figure 8:
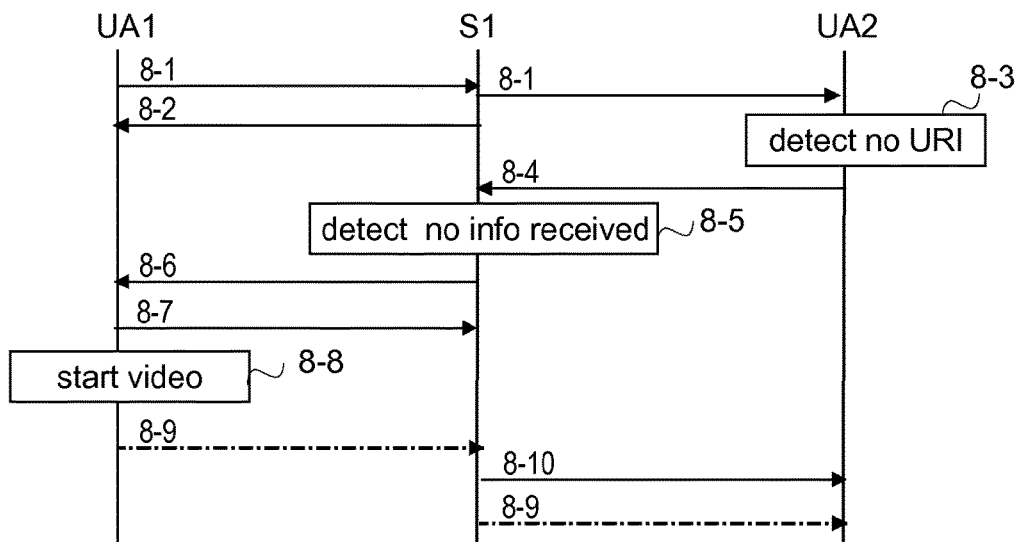

In the example of FIGS. 7 and 8 it is assumed that the caller information is a video stream, Alice's user apparatus UA1 contains an address to Bob, or to a user apparatus UA2 used by Bob, and the video stream as well as any other user traffic between UA1 and UA2 passes through a server S1.

Referring to FIG. 7, Alice has inputted to her user apparatus UA1 that she wants to call to Bob. Therefore, UA1 sends to UA2 through S1 message 7-1 which is a call establishment message containing a called party address, and in the illustrated example media definitions for an audio call It should be appreciated that in other examples message 7-1 contains definitions for and audio call and for a video call, or definitions only for a video call.

S1 forwards message 7-1 to UA2, and sends an acknowledgement to it in message 7-2. In response to message 7-2, UA1 starts to output a ringing tone so that Alice assumes Bob's user apparatus is ringing.

To deliver the caller information, which according to Alice's settings is to be delivered, UA1 sends to S1 message 7-3, which is a message requesting a connection for delivering the caller information. S1 responds by message 7-4, which is a message accepting the connection for the caller information, and indicating an address whereto send the caller information. Now UA1 starts to forward a video stream 7-5 to S1.

Meanwhile UA2 detects in point 7-6 that message 7-1 contains no URI. Since Bob's settings require the caller information, UA2 sends to S1 message 7-8, which is a message requesting the caller information relating to the call establishment request received in message 7-1.

S1 detects in point 7-9 that message 7-8 requests caller information already received by S1. Therefore, S1 forwards the video stream 7-5, i.e. the caller information, to UA2.

In response to receiving the caller information, UA2 generates in point 7-10 a ringing tone and displays the video stream to Bob. In point 7-11 UA2 detects that Bob answers the call by selecting a video call although the original call establishment request indicated only an audio call. UA2 sends message 7-12, which is a message indicating that Bob answered to Alice's call and wants to have a video call.

In the illustrated example, S1 and UA1 are configured to interpret that message 7-12 also ends forwarding the caller information. Therefore, S1 forwards message 7-12 and also stops in point 7-13 forwarding the video stream 7-5.

When receiving message 7-12, UA1 stops forwarding video stream 7-5, detects that 7-12 contains another type of call as originally requested and that Alice's user settings require a permission to change the type from an audio call to a video call, and therefore prompts in point 7-14 Alice either to accept the call as a video call or to refrain the call as an audio call. It should be appreciated that in another implementation Alice is not prompted to accept the change from audio call to video call. In the illustrated example Alice accepts the video call. UA1 informs UA2 that the video call is accepted by sending message 7-15. Then a two-way video stream 7-16 is established for the call.

In another implementation, S1 sends instead of message 7-1, a message that contains the call establishment request and URI.

FIG. 8 illustrates signalling in a similar situation like FIG. 7. However, in the example no caller information is delivered from UA1 without an explicit request originating from called party's user apparatus.

Referring to FIG. 8, Alice has inputted to her user apparatus UA1 that she wants to call to Bob. Therefore, UA1 sends to S1 message 8-1 corresponding to message 7-1. S1 forwards message 8-1 to UA2, and sends an acknowledgement to message 8-1 in message 8-2. In response to message 8-2, UA1 starts to output a ringing tone so that Alice assumes Bob's user apparatus is ringing.

UA2 detects in point 8-3 that message 8-1 contains no URI. Since Bob's settings require the caller information, UA2 sends to UA1 through S1 message 8-4, the message requesting caller information about the caller from whose user apparatus the call establishment request received in message 8-1 originates.

S1 detects in point 8-5 that message 8-4 requests caller information that is not received from UA1. S1 sends to UA1 message 8-6, which is a message requesting a connection for delivering caller information and indicating an address whereto send the caller information. Message 8-6 may be the same message as message 8-4. UA1 responds by message 8-7, which is a message accepting the connection for the caller information. Further, UA1 starts in point 8-8 to capture the video which UA1 then forwards in a video stream 8-9 to S1. By starting the capturing at this point, it is ensured that there is caller information that may be pushed or pulled to UA2 but the caller information is sent in the example only after UA2 requested for the caller information.

S1 detects that UA1 accepted the caller information delivery (message 8-7) and triggers a connection establishment for the caller information delivery to UA2 by sending message 8-10. Further, S1 forwards the video stream 8-9 to UA2. Therefrom the procedure continues as from point 7-12 from FIG. 7, i.e. UA2 generates a ringing tone and displays the video stream to Bob and hence is not repeated in vain here.

In the examples of FIGS. 4, 5, 6, 7 and 8 the user apparatus UA1 and UA2 delivers the caller information without any specific user input from Alice and Bob. Hence, calling and answering to a call are as smooth as calling and answering without the caller information.

Figure 9:
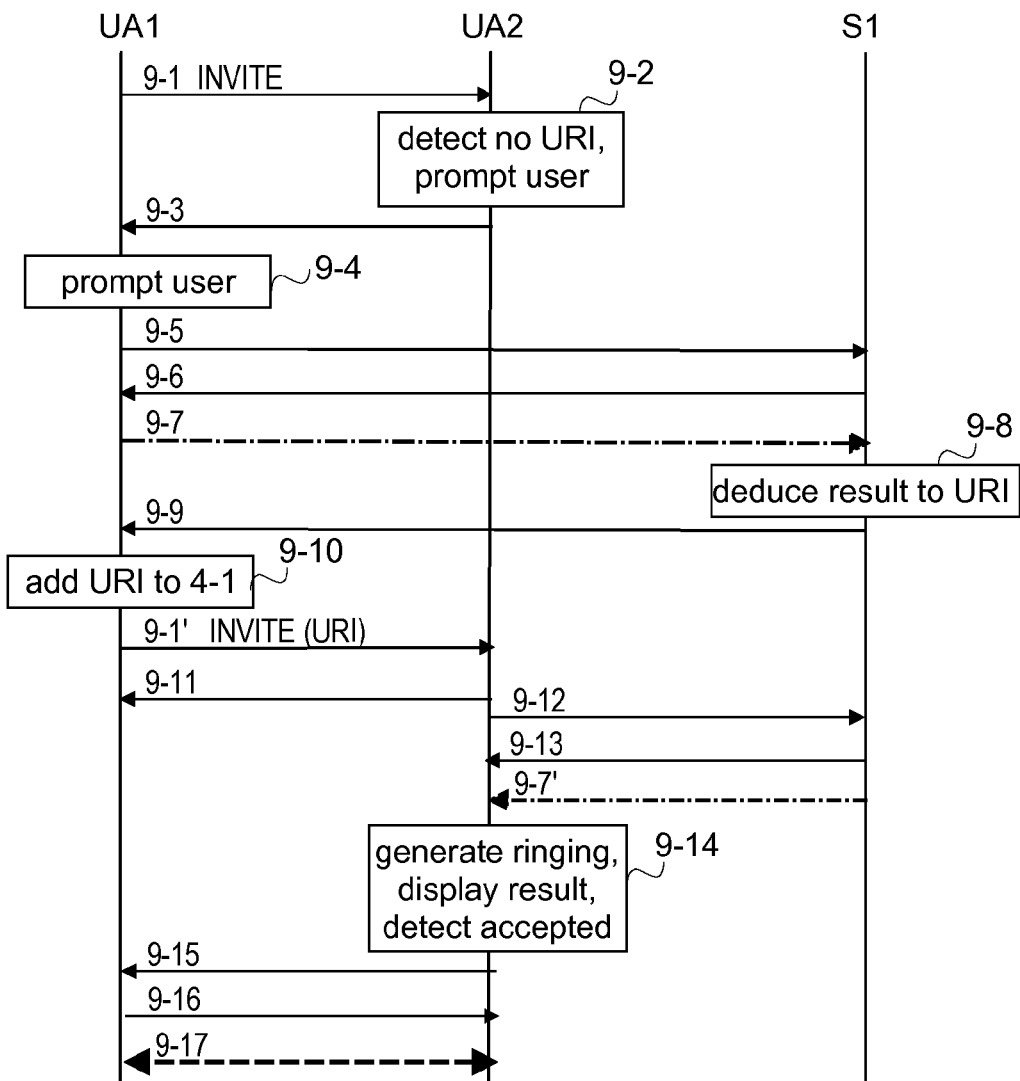

Referring to FIG. 9, Alice has inputted to her user apparatus UA1 that she wants to call to Bob. Therefore, UA1 sends to UA2 message 9-1 which is a SIP INVITE message containing calling party address, called party address, and media definitions for an audio call and/or for a video call and other information.

UA2 detects in point 9-2 that message 9-1 does not contain URI. Bob's user settings require that in such a case Bob is prompted for whether or not to request caller information, and UA2 prompts Bob in point 9-2 accordingly. Bob may be prompted by simply displaying "An incoming call from Alice without caller information is pending. Do you want to request the information", or the Bob may be prompted to select also the type of the caller information Bob wants to have and/or the Bob may also be given alternative to reject or soft reject the call attempt. Examples of different selection alternatives are described with step 301 above. In the illustrated example, Bob becomes suspicious because typically Alice calls with the caller information. Therefore, Bob selects as the caller information "verify user by a finger print". In response to Bob's user input UA2 sends message 9-3 indicating a missing URI to UA1. An advantage of the feature is that the called party may decide whether or not to request further information on the calling party before deciding whether or not to answer. There may be different messages 9-3 for different types of caller information and/or message 9-3 may contain a field indicating the type or types of the caller information wanted.

In response to receiving message 9-3, UA1 prompts in point 9-4 Alice that a fingerprint is needed to continue the call establishment to Bob. Since in the illustrated example Alice wants to continue, Alice inputs in point 9-4 UA1 her fingerprint as a user input. The fingerprint may be inputted by taking a snapshot, for example. In Alice's settings there is an address to a server S1 that has Alice's pre-stored fingerprint. UA1 and S1 establishes by messages 9-5, and 9-6 a connection, and then UA1 sends message 9-7 containing the fingerprint for verifying the fingerprint. It should be appreciated that if the use of the user apparatus UA1 requires fingerprint verification, there is no need to prompt the user in point 9-4, but the fingerprint used to obtain a permission to use UA1 may be forwarded in message 9-7, or both the fingerprint obtained when the permission to use was decided and the fingerprint in the memory used in the comparison during the permission may be sent in message 9-7. In such a case the server does not have to store fingerprints.

S1 verifies that the fingerprint is Alice's fingerprint, and stores the result temporary to a storage area in point 9-8, and sends URI indicating the storage area in message 9-9.

After receiving URI, UA1 adds in point 9-10 URI to message 9-1 and sends the invitation with URI in message 9-1' to UA2.

UA2 detects that message 9-1' is an update of message 9-1 and contains URI. Therefore, UA2 sends messages 9-11 to UA1, messages 9-11 indicating the request sent in message 9-1 as pending, and a connection establishment message 9-12 to S1 indicated by URI. In another example, message 9-11 is sent immediately after receiving message 9-1.

In response to message 9-12 S1 accepts the connection by sending message 9-13 and retrieves the result from the storage area, releasing the storage area for other use, and forwards the result to UA2 in message 9-7'.

UA2 generates in point 9-14 a ringing tone and displays the result to Bob. In point 9-14 UA2 detects that Bob answers the call which in the illustrated example is an audio call. UA2 sends message 9-15 (SIP 200 OK) indicating Bob's answer.

In response to message 9-15, UA1 acknowledges by message 9-16 (SIP ACK), and a bi-directional audio 9-17 via RTP is established between Alice and Bob.

Figure 10:
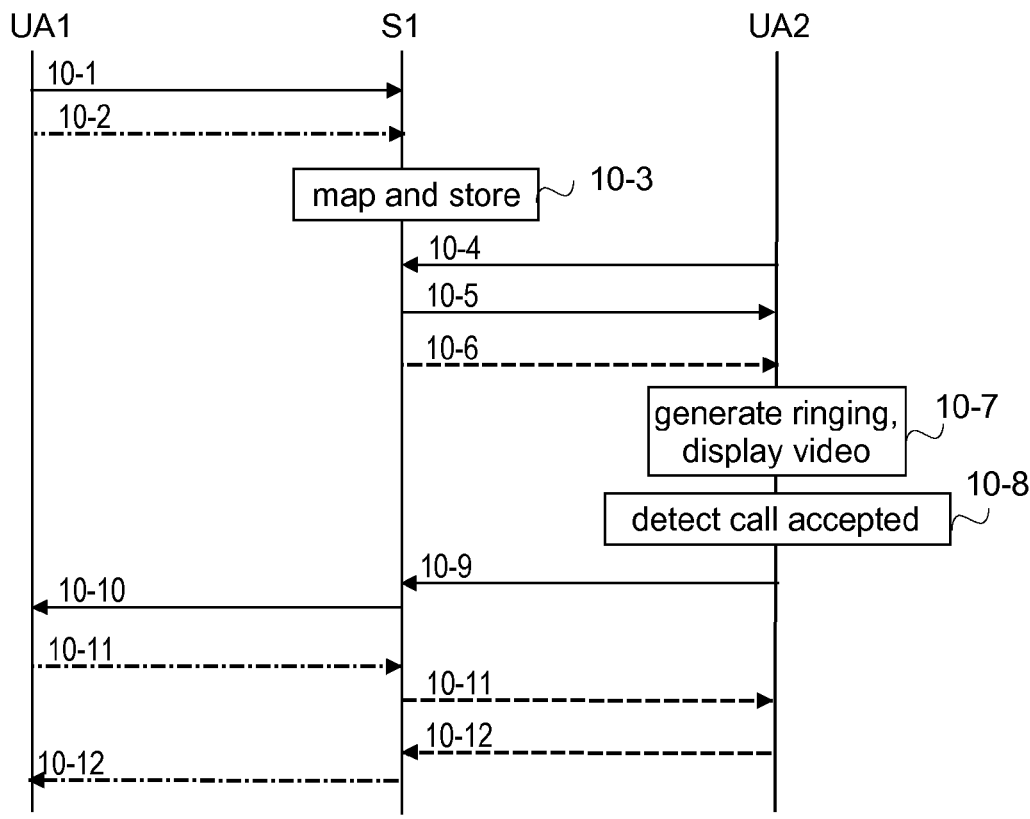

FIG. 10 illustrates signalling in a centralized system in which a connection between a calling party and a called party is actually two separate connections, one between the calling party and a centralized server and one between the centralized server and the called party. In such a centralized system, a call client in a user apparatus is configured to poll, at least when not engaged in a communication, periodically the server to find out any pending call establishment requests, and a communication is initiated from the call client to the server. In the illustrated example the call client is configured to communicate in a REST (representational state transfer style) using HHTP GET requests and RTMP, without restricting the example to such a solution. Further in the example, the reference to the resource containing the caller information is a combination of the caller identifier and the called party identifier. Further, in the example it is assumed that the centralized server S1 is configured to store the caller information only a very short time, such as milliseconds, in order to secure that the information fulfils the criteria of real-time or near-real-time, without restricting the example to such a solution. In the example of FIG. 10 it is assumed that the caller information is a video stream, Alice's user apparatus UA1 contains an address to Bob, or to a user apparatus UA2 used by Bob, and that the settings in the Alice's user apparatus indicate that the caller information is always delivered when Alice selects to call someone.

Referring to FIG. 10, Alice has inputted to her user apparatus UA1 that she wants to call to Bob. To establish the connection and to deliver the caller information, which according to Alice's settings is to be delivered, UA1 sends to S1 message 10-1, which is a message requesting a connection to Bob's user apparatus UA2, such as a "Call request" (HTTP) and for delivering the caller information, i.e. the video stream messages 10-2, such as a "NetStream Publish Audio/Video" (RTMP).

S1 maps in point 10-3 the request by creating a record for the call, by reserving some memory resources for the temporary storing of the caller information, and by creating an event for UA2. The record contains both the caller identifier and the called party identifier which are used by UA1 and UA2 to refer to the call in question, and hence by means of them the record is found, and thereby the caller information is found.

When UA2 next time polls S1 by message 10-4, such as "Event Poll, periodical" (HTTP), S1 informs about the call establishment request by sending message 10-5 and the caller information in message 10-6. Message 10-6 corresponds to message 10-2.

In response to receiving messages 10-5 and 10-6, UA2 notifies in point 10-7 Bob about the call establishment request by generating a ringing tone and by displaying the caller information, i.e. the video. When UA2 detects in point 10-8 that the call is accepted, the process continues as in prior art. More precisely, UA2 sends message 10-9 to S1, such as "Call request" (HTTP), which then confirms UA1 that Bob answered by sending message 10-10, such as "Call Response" (HTTP). Then a video or audio call is going on by exchange of messages 10-11 (from Alice to S1, from S1 to Bob) and messages 10-12 (from Bob to S1, from S1 to Alice). Messages 10-11 and 10-12 may correspond to message 10-2.

Figure 11:
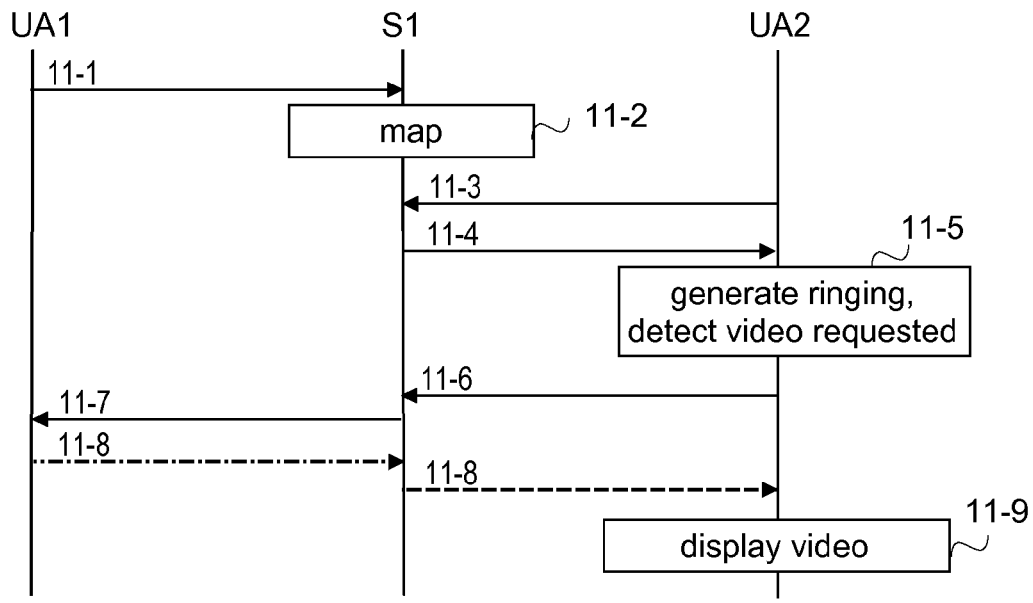

The example illustrated in FIG. 11 differs from the example of FIG. 10 in that the caller information is sent only if specifically requested by Bob. For example, Alice's settings may be "do not send caller information unless requested" and Bob's settings may be "alert and provide opportunity to request caller information if not received". In other words, in FIG. 10 the connection establishment request and the information is sent consecutively without any specific request for the information, and in FIG. 10 or sending the information is sent in response to a specific request.

Referring to FIG. 11, Alice has inputted to her user apparatus UA1 that she wants to call to Bob. To establish the connection UA1 sends to S1 message 11-1, which is a message requesting a connection to Bob's user apparatus UA2.

S1 maps in point 11-2 the request by creating a record for the call, by reserving provisionally some memory resources for the temporary storing of the caller information, and by creating an event for UA2. It should be appreciated that in another solution no memory resources for the temporary storing of the caller information is reserved.

When UA2 next time polls S1 by message 11-3, S1 informs about the call establishment request by sending message 11-4.

In response to receiving message 11-4, UA2 notifies in point 11-5 Bob about the call establishment request by generating a ringing tone and by displaying a selection tool for requesting caller information. In the illustrated example Bob selects to request the caller information, which UA2 detects in point 11-5. Therefore, UA2 sends message 11-6, such as "Preview Request" (HTTP), that request the caller information from the caller.

Since S1 can map the request to the existing record S1 informs UA1 about the request by sending message 11-7, such as "Preview Response" (HTTP).

In the example it is assumed that no reaction from Alice is needed. Therefore, in response to message 11-7, UA1 starts to deliver the caller information in message 11-8 to S1 which maps the caller information to the call request and sends the caller information to UA2 (message 11-8).

In response to receiving the caller information, which is assumed to be the video, UA2 displays in point 11-9 the caller information to Bob. Then, if the Bob accepts the call, the process continues as described above from point 10-8.

As is evident from the above examples, the calling party and/or the calling party's user apparatus may provide, prior a requested connection is accepted, information about the exact real-time moment, which would often be the most critical information based on which the recipient needs to make his or her decision on whether to answer or not.

Although not explicitly said above, it should be appreciated that the user apparatus(es) via which the caller information is outputted to the called party may be different from the user apparatus which the called party uses when he or she accepts the call (connection).

In the above examples of FIGS. 4 to 9 it is assumed that the caller information is received. It should be appreciated that if no caller information is received, the process may continue as described above with FIG. 2.

Although not explicitly said above, it should be appreciated that even when the caller information is received, the called party may be prompted, or otherwise provided an opportunity, to request some further caller information.

The steps/points, messages and related functions described above in FIGS. 2 to 11 are in no absolute chronological order, and some of the steps/points may be performed and messages may be sent simultaneously or in an order differing from the given one. For example, when the push principle is used, the calling party may inquiry the called party, whether or not the called party is willing to receive UCI before answering to the call establishment request, and if the called party is willing to receive UCI, the calling party will send UCI to the called party while the call establishment request is pending. Other functions can also be executed between the steps/points or within the steps/points and other messages sent between the illustrated messages. For example, Bob may send Alice a text message instructing Alice to move her web camera so that Bob sees Alice better before Bob answers the call. Some of the steps/points/messages or part of the steps/points/messages can also be left out or replaced by a corresponding step/point/message or part of the step/point/message. The messages are only exemplary and may even comprise several separate messages for transmitting the same information.

By combining the above described functionalities different services or applications may be created. For example, a service provider can have services "Secure", "Easy" and "Premium"; the service "Secure" ensuring that the calling party is a known party with user apparatus having certain capabilities/features and providing to a called one the caller information in the format the called one has indicated that he/she wants to have the caller information; the service "Easy" ensuring that caller information is provided, and the service "Premium" allowing a user to select amongst different service modes, like one corresponding to Secure, one corresponding to Easy.

Figure 12:
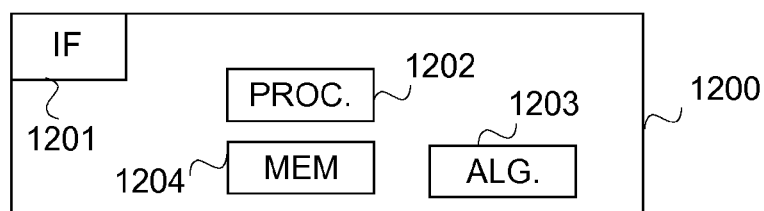
FIG. 12 is a block diagram of an exemplary apparatus.

FIG. 12 is a simplified block diagram illustrating some units for an apparatus 1200 configured to a user apparatus comprising the calling information unit, or corresponding functionality, or a centralized server configured to perform functionality described above with FIG. 10 or 11, or corresponding functionality. In the illustrated example, the apparatus comprises one or more interfaces (IF) 1201 for receiving and transmitting information, a processor 1202 configured to implement at least the calling information unit functionality/functionalities described herein with a user apparatus, with corresponding algorithms 1203, and memory 1204 usable for storing a program code required for the calling information unit and/or the centralized server configuration, and the algorithms. The memory 1204 is also usable for storing other possible information, like different settings or rules or profiles.

In other words, an apparatus configured to provide the user apparatus, and/or the centralized server, and/or any corresponding apparatus configured to provide one or more corresponding functionalities, is a computing device that may be any apparatus or device or equipment configured to perform one or more of corresponding apparatus functionalities described above with an embodiment/example/implementation, and it may be configured to perform functionalities from different embodiments/examples/implementations. The unit(s), such as the calling party information unit, described with an apparatus may be separate units, even located in another physical apparatus, the physical apparatus(es) forming one logical apparatus providing the functionality, or integrated to another unit in the same apparatus. In other embodiments, a unit in an apparatus, or part of the unit's functionality, may be located in another physical apparatus.

More precisely, the units, such as the calling party information unit, and entities may be software and/or software-hardware and/or firmware components (recorded indelibly on a medium such as read-only-memory or embodied in hard-wired computer circuitry). The techniques described herein may be implemented by various means so that an apparatus implementing one or more functions of a corresponding apparatus/entity described with an embodiment/example/implementation comprises not only prior art means, but also means for implementing the one or more functions of a corresponding apparatus described with an embodiment/example/implementation and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. Software codes may be stored in any suitable, processor/computer-readable data storage medium(s) or memory unit(s) or article(s) of manufacture and executed by one or more processors/computers.

An apparatus configured to provide the user apparatus, and/or the centralized server, and/or any corresponding apparatus configured to provide one or more corresponding functionalities, may generally include a processor, controller, control unit, micro-controller, or the like connected to a memory and to various interfaces of the apparatus. Generally, the processor is a central processing unit, but the processor may be an additional operation processor. Each or some or one of the units/entities, such as the calling party information unit, described herein may be configured as a computer or a processor, or a microprocessor, such as a single-chip computer element, or as a chipset, including at least a memory for providing storage area used for arithmetic operation and an operation processor for executing the arithmetic operation. Each or some or one of the units/entities described above may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed in such a way to carry out one or more functions of one or more embodiments. In other words, each or some or one of the units/entities described above may be an element that comprises one or more arithmetic logic units, a number of special registers and control circuits.

Further, an apparatus configured to provide the user apparatus, and/or the centralized server, and/or any corresponding apparatus configured to provide one or more corresponding functionalities, may generally include volatile and/or non-volatile memory, for example EEPROM, ROM, PROM, RAM, DRAM, SRAM, double floating-gate field effect transistor, firmware, programmable logic, etc. and typically store content, data, or the like. The memory or memories, especially when storing of media stream content is provided, may be of any type (different from each other), have any possible storage structure and, if required, being managed by any database/cache management system. The memory may also store computer program code such as software applications (for example, for one or more of the units/entities) or operating systems, information, data, content, or the like for the processor to perform steps associated with operation of the apparatus in accordance with embodiments. The memory, or part of it, may be, for example, random access memory, a hard drive, or other fixed data memory or storage device implemented within the processor/apparatus or external to the processor/apparatus in which case it can be communicatively coupled to the processor/network node via various means as is known in the art. Examples of an external memory include a removable memory detachably connected to the apparatus, a distributed database and a cloud server.

Although in the above examples it is assumed that the information on a calling party is displayed to the called party, it is obvious to one skilled in the art that the information may be outputted using a speech synthesizer, or using a tactile output, or outputting different kinds of vibration, for example comprising a silent part and vibration part, each part having a varying length, and any other mean providing sensible output It will be obvious to a person skilled in the art that, as the technology advances, the inventive concept can be implemented in various ways. The invention and its embodiments are not limited to the examples described above but may vary within the scope of the claims.

What is claimed is:

1. A method for a called party apparatus, the method comprising:
    receiving a message, via a one-way connection from a calling party apparatus to the called party apparatus, the message indicating a two-way connection establishment request from the calling party apparatus, the message including content or a reference to a resource comprising the content;
    receiving the content from the calling party apparatus or retrieving the content from the resource;
    detecting whether or not the content is in a format that is not supported by the called party apparatus; and when it is detected that the content is in the format not supported by the called party apparatus, sending to the calling party apparatus a request indicating a format for the content that is supported by the called party apparatus;
    receiving, from the calling party apparatus, the content in the format supported by the called party apparatus, wherein the content in the format supported by the called party apparatus comprises a video stream of a calling party associated with the calling party apparatus that is captured in real-time and transmitted in real-time in a continuous manner by the calling party apparatus beginning at a point of time the connection establishment request is sent, or near the point of time the connection establishment request is sent, and continuing to be transmitted at least as long as the connection establishment request is pending;
    displaying the real-time caller information on a display of the called party apparatus;
    detecting a user input of an acceptance or a rejection of the two-way connection establishment request; and
    accepting or rejecting the two-way connection establishment request based on the detected user input.

2. The method according to claim 1, wherein the real-time caller information is captured at the calling party apparatus and is sent from the calling party apparatus to the called party apparatus within a certain time period after capture.

3. The method according to claim 2, wherein the certain time period is set to depend on an information type of the real-time caller information.

4. The method according to claim 3, wherein the information type is video.

5. The method according to claim 1, wherein the real-time caller information is received using a Real-time Transport Protocol (RTP).

6. The method according to claim 1, further comprising releasing the one-way connection and establishing a two-way connection between the calling party apparatus and the called party apparatus when the two-way connection establishment request is accepted at the called party apparatus.

7. The method according to claim 1, further comprising upgrading the one-way connection to a two-way connection between the calling party apparatus and the called party apparatus when the two-way connection establishment request is accepted at the called party apparatus.

8. A method for a calling party apparatus, the method comprising:
   detecting a user input indicating a request to establish a connection to a called party apparatus;
   sending a message, via a one-way connection from the calling party apparatus to the called party apparatus, the message indicating a two-way connection establishment request from the calling party apparatus, the message including content or a reference to a resource comprising the content;
   receiving, from the called party apparatus, a request indicating a format for the content that is supported by the called party apparatus, the request being received when the content is in a format that is not supported by the called party apparatus; and
   sending, to the called party apparatus or to the resource, the content in the format supported by the called party apparatus, wherein the content in the format supported by the called party apparatus comprises a video stream of a calling party associated with the calling party apparatus that is captured in real-time and transmitted in real-time in a continuous manner by the calling party apparatus beginning at a point of time the connection establishment request is sent, or near the point of time the connection establishment request is sent, and continuing to be transmitted at least as long as the connection establishment request is pending.

9. The method according to claim 8, further comprising capturing the real-time caller information at the calling party apparatus, and sending the real-time caller information to the called party apparatus within a certain time period after capture.

10. The method according to claim 9, wherein the certain time period is set to depend on an information type of the real-time caller information.

11. The method according to claim 10, wherein the information type is video.

12. The method according to claim 8, wherein the real-time caller information is sent using a Real-time Transport Protocol (RTP).

13. The method according to claim 8, further comprising releasing the one-way connection and establishing a two-way connection between the calling party apparatus and the called party apparatus when the two-way connection establishment request is accepted at the called party apparatus.

14. The method according to claim 8, further comprising upgrading the one-way connection to a two-way connection between the calling party apparatus and the called party apparatus when the two-way connection establishment request is accepted at the called party apparatus.

15. A computer program product comprising a non-transitory machine-readable data storage medium having stored thereon program instructions that, when executed by a processor of a called party apparatus, cause the processor to:
   receive a message, via a one-way connection from a calling party apparatus to the called party apparatus, the message indicating a two-way connection establishment request from the calling party apparatus, the message including content or a reference to a resource comprising the content;
   receive the content from the calling party apparatus or retrieve the content from the resource;
   detect whether or not the content is in a format that is not supported by the called party apparatus; and when it is detected that the content is in the format not supported by the called party apparatus, send to the calling party apparatus a request indicating a format for the content that is supported by the called party apparatus;
   receive, from the calling party apparatus, the content in the format supported by the called party apparatus, wherein the content in the format supported by the called party apparatus comprises a video stream of a calling party associated with the calling party apparatus that is captured in real-time and transmitted in real-time in a continuous manner by the calling party apparatus beginning at a point of time the connection establishment request is sent, or near the point of time the connection establishment request is sent, and continuing to be transmitted at least as long as the connection establishment request is pending;
   display the real-time caller information on a display of the called party apparatus;
   detect a user input of an acceptance or a rejection of the two-way connection establishment request; and
   accept or reject the two-way connection establishment request based on the detected user input.

16. A computer program product comprising a non-transitory machine-readable data storage medium having stored thereon program instructions that, when executed by a processor of a calling party apparatus, cause the processor to:
   detect a user input indicating a request to establish a connection to a called party apparatus;
   send a message, via a one-way connection from the calling party apparatus to the called party apparatus, the message indicating a two-way connection establishment request from the calling party apparatus, the message including content or a reference to a resource comprising the content;
   receive, from the called party apparatus, a request indicating a format for the content that is supported by the called party apparatus, the request being received when the content is in a format that is not supported by the called party apparatus; and
   send, to the called party apparatus or to the resource, the content in the format supported by the called party apparatus, wherein the content in the format supported by the called party apparatus comprises a video stream of a calling party associated with the calling party apparatus that is captured in real-time and transmitted in real-time in a continuous manner by the calling party apparatus beginning at a point of time the connection establishment request is sent, or near the point of time the connection establishment request is sent, and continuing to be transmitted at least as long as the connection establishment request is pending.

17. The computer program product according to claim 16, wherein the program instructions, when executed by the processor, cause the processor to capture the real-time caller information at the calling party apparatus, and to send the real-time caller information to the called party apparatus within a certain time period after capture.

18. The computer program product according to claim 17, wherein the certain time period is set to depend on an information type of the real-time caller information.

19. The computer program product according to claim 18, wherein the information type is video.

20. The computer program product according to claim 16, wherein the real-time caller information is sent using a Real-time Transport Protocol (RTP).

* * * * *